2,996,393
OPTICAL GLASS

Heinz Brömer, Hermannstein, and Norbert Meinert, Wetzlar (Lahn), Germany, assignors to Ernst Leitz, G.m.b.H., Wetzlar (Lahn), Germany, a corporation of Germany
No Drawing. Filed Aug. 20, 1959, Ser. No. 834,954
Claims priority, application Germany Sept. 24, 1958
9 Claims. (Cl. 106—47)

Our invention relates to optical glasses with a small dispersion in relation to their refractive index.

Glasses in this optical range are known and indeed obtained by melting down mixtures which contain a considerable amount of oxides of the rare earths. Also compositions are known which contain considerable amounts of barium oxide or strontium oxide or both and with which boric oxide or silica or both are used as glass formers.

We have discovered that the amount of barium oxide or strontium oxide or both can be considerably decreased upon the addition of zinc especially as zinc borate. Through the decrease of the barium oxide content of the glass, according to our invention, the glasses are more stable chemically without change in the optical values. To these glasses oxides of magnesium and calcium as well as zirconium oxide and silica may be added. We have found it useful to select a content of barium borate between 5% and 45% by weight, and zinc borate between 20% and 30% by weight. A further addition of zinc oxide permits less than 5% by weight of magnesium oxide and/or less than 18% by weight of calcium oxide, less than 7.5% by weight of zirconium oxide and of silica less than 10% by weight. For controlling the index of refraction tungsten oxide below 5% by weight and lead oxide below 10% by weight can be used. To stabilize the glasses further an amount of aluminum oxide up to 10% may be used. Instead of tungsten tantalum oxide or niobium oxide or both may be substituted in whole or in part. The zinc may be substituted in part by cadmium.

In the followng Table 1 is shown first that a substitution of barium borate by zinc borate leaves the optical values unchanged.

In Table 2 are shown glasses to which zirconium oxide and silica have been added. In it the glasses Br/IV/30 and Br/IV/31 have the same mol ratio of barium borate to zinc borate as the glass Br/IV/23 of Table 1, the glasses Br/IV/35 and Br/IV/36 the same as glass Br/IV/20, and the glass Br/IV/33 the same as the glass Br/IV/19. It shows that the addition of zirconium oxide leads to a considerable increase in the index of refraction. Moreover these glasses are more resistant chemically.

*Table 2 in percent by weight*

| Melt No. | Ba(BO$_2$)$_2$ | Zn(BO$_2$)$_2$ | ZrO$_2$ | SiO$_2$ | $n_e$ | $\nu_e$ |
|---|---|---|---|---|---|---|
| Br/IV/30 | 72.8 | 24.7 | 2.5 | -------- | 1.669 | 53.7 |
| Br/IV/31 | 71.0 | 24.1 | 4.9 | -------- | 1.676 | 52.6 |
| Br/IV/35 | 60.5 | 32.8 | 6.7 | -------- | 1.6777 | 51.6 |
| Br/IV/36 | 55.5 | 30.1 | 11.8 | 2.6 | 1.690 | -------- |
| Br/IV/33 | 53.0 | 36.0 | 11.0 | -------- | 1.672 | 51.6 |

In the glasses of Table 3, either barium oxide and zinc oxide are added as borates. Additionally there are added to the mixture substantial amounts of zinc oxide and silica as well as zirconium oxide for stabilizing. With the aid of a further addition of lead oxide—obviously tungsten, tantalum and/or niobium could be used—the indices of refraction of the glasses thereby obtained are further increased. These glasses free from rare earth metal compounds already extend into the region which are known in the literature under the name lanthanum-flint type of glasses. The sum of borates of barium and zinc lies between 50% and 80% by weight in which not more than 25% by weight of barium borate is used. The additional insertion of zinc oxide portion does not exceed 15% by weight. Silica is less than 15% by weight and zirconium oxide content is less than 8% by weight of the mixture. The lead oxide content can be present up to 20% by weight. Instead of zinc oxide cadmium oxide can also be used. To control the index of refraction and dispersion tungsten oxide and/or tantalum oxide and/or niobium oxide find application.

*Table 3 in percent by weight*

| Melt No. | Ba(BO$_2$)$_2$ | Zn(BO$_2$)$_2$ | ZnO | SiO$_2$ | ZrO$_2$ | PbO | $n_e$ | $\nu_e$ |
|---|---|---|---|---|---|---|---|---|
| Br/III/1 | 20.4 | 46.0 | 12.4 | 13.7 | 7.5 | -------- | 1.667 | 49.7 |
| Br/III/2 | 19.7 | 44.5 | 11.9 | 13.3 | 7.3 | 3.3 | 1.673 | 48.2 |
| Br/III/3 | 19.1 | 43.1 | 11.6 | 12.8 | 7.0 | 6.4 | 1.680 | 46.6 |
| Br/III/4 | 18.5 | 41.7 | 11.2 | 12.4 | 6.9 | 9.3 | 1.691 | 44.8 |
| Br/III/5 | 18.0 | 40.5 | 10.9 | 12.0 | 6.6 | 12.0 | 1.698 | 43.8 |
| Br/III/6 | 16.6 | 37.5 | 10.1 | 11.2 | 6.1 | 18.5 | 1.706 | 41.2 |

*Table 1 in percent by weight*

| Melt No. | Ba(BO$_2$)$_2$ | Zn(BO$_2$)$_2$ | ZrO$_2$ | SiO$_2$ | $n_e$ | $\nu_e$ |
|---|---|---|---|---|---|---|
| Br/IV/23 | 74.7 | 25.3 | -------- | -------- | 1.658 | 54.6 |
| Br/IV/22 | 72.0 | 28.0 | -------- | -------- | 1.658 | 54.6 |
| Br/IV/21 | 68.9 | 31.1 | -------- | -------- | 1.659 | 54.8 |
| Br/IV/20 | 64.9 | 35.1 | -------- | -------- | 1.658 | 54.6 |
| Br/IV/19 | 59.6 | 40.4 | -------- | -------- | 1.656 | 54.5 |
| Br/IV/18 | 46.3 | 53.7 | -------- | -------- | 1.651 | 54.0 |

In Table 4 there are further examples of mixture additions with barium and zinc as borates together with further addition of zinc oxide and/or cadmium oxide. For stabilizing again there are added to the mixture in part zirconium oxide and silica. In one example the barium borate is substituted in part by calcium borate.

Table 4 in percent by weight

| Melt No. | Br/IV/39 | Br/IV/40 | Br/IV/41 | Br/IV/42 | Br/IV/43 | Br/IV/44 | Br/IV/45 | Br/IV/46 | Br/IV/47 | Br/IV/48 | Br/IV/49 | Br/IV/59 | Br/IV/51 |
|---|---|---|---|---|---|---|---|---|---|---|---|---|---|
| $Ba(BO_2)_2$ | 61.9 | 59.3 | 56.8 | 54.5 | 52.5 | 50.5 | 56.4 | 50.0 | 47.3 | 44.8 | 58.0 | 53.0 | 30.0 |
| $Zn(BO_2)_2$ | 33.6 | 32.1 | 30.8 | 29.6 | 28.4 | 27.2 | 30.6 | 27.1 | 25.6 | 24.3 | 31.4 | 28.8 | 32.4 |
| ZnO | 4.5 | 8.6 | 12.4 | 15.9 | 19.1 | 22.1 | | | | | 4.2 | 3.8 | 4.4 |
| CdO | | | | | | | 13.0 | | | | | | |
| $ZrO_2$ | | | | | | | | | | | | | |
| $SiO_2$ | | | | | | | | | | | 6.4 | 9.4 | 10.6 |
| $Ca(BO_2)_2$ | | | | | | | | | | | | 5.0 | 5.7 |
| | | | | | | | | | | | | | 16.9 |
| $n_e$ | 1.670 | 1.668 | 1.673 | 1.678 | 1.683 | 1.688 | 1.685 | 1.706 | 1.716 | 1.726 | 1.685 | 1.686 | 1.679 |
| $\nu_e$ | 53.8 | 52.7 | 51.7 | 50.8 | 49.9 | 48.7 | 50.6 | 47.2 | 45.7 | 44.4 | 50.9 | 50.4 | 50.4 |

In Table 5 are given examples of glasses which besides barium borate and zinc borate have additions of calcium borate, zinc oxide, zirconium oxide, silica, tungsten oxide, lead oxide and aluminum oxide.

Table 5 in percent by weight

| Melt No. | Br/IV/77 | Br/IV/78 | Br/IV/79 | Br/IV/82 | Br/IV/70 | Br/IV/71 | Br/IV/72 | Br/IV/73 | Br/IV/74 | Br/IV/75 | Br/IV/76 | Br/IV/80 | Br/IV/81 |
|---|---|---|---|---|---|---|---|---|---|---|---|---|---|
| $Ca(BO_2)_2$ | 10.0 | 20.0 | 19.5 | 20.3 | 39.0 | 38.2 | 38.1 | 37.2 | 37.2 | 37.2 | 37.2 | 18.6 | 17.8 |
| $Ba(BO_2)_2$ | 43.0 | 33.0 | 32.2 | 33.4 | 13.8 | 13.5 | 13.5 | 13.1 | 13.1 | 13.1 | 13.1 | 30.7 | 29.2 |
| $Zn(BO_2)_2$ | 28.8 | 28.8 | 28.1 | 29.2 | 26.0 | 25.4 | 25.4 | 24.7 | 24.7 | 24.7 | 24.7 | 26.8 | 25.6 |
| ZnO | 3.8 | 3.8 | 3.7 | | 2.3 | 2.2 | 2.2 | 2.1 | 2.1 | 2.1 | 2.1 | 3.5 | 3.4 |
| $ZrO_2$ | 5.0 | 5.0 | 7.3 | 7.6 | 7.2 | 7.0 | 7.0 | 6.8 | 6.8 | 6.8 | 6.8 | 7.0 | 6.7 |
| $SiO_2$ | 9.4 | 9.4 | 9.2 | 9.5 | 9.0 | 8.8 | 8.8 | 8.6 | 8.6 | 8.6 | 8.6 | 8.7 | 8.4 |
| $WO_3$ | | | | 2.7 | 4.9 | 2.7 | 2.6 | 2.6 | | | | | |
| PbO | | | | | | | 2.3 | 4.9 | | 4.9 | | 4.7 | |
| $Al_2O_3$ | | | | | | | | | 4.9 | 2.6 | 7.5 | | 8.9 |
| $n_e$ | 1.661 | 1.658 | 1.665 | 1.660 | 1.660 | 1.663 | 1.663 | 1.672 | 1.652 | 1.661 | 1.642 | 1.675 | 1.685 |
| $\nu_e$ | 53.5 | 53.9 | 53.2 | 53.9 | 53.4 | 52.6 | 5.7 | 50.3 | 53.4 | 51.5 | 54.2 | 50.2 | 47.8 |

Instead of calcium borate magnesium borate can be used either entirely or in part and for barium strontium borate can be used either entirely or in part. If instead of zinc borate or zinc oxide, cadmium borate or cadmium oxide be substituted in part or entirely the index of refraction can be raised substantially at the expense of the dispersion.

Technically known minor additions for further stabilizing, as aluminum oxide and the like, or additions for decolorizing, as arsenic oxide and additions which facilitate melting such as small additions of alkali oxides or cryolite, lie within the field of the above invention.

The mixtures are suitably melted down in platinum vessels: the temperature adjusts itself essentially to the zirconium compound or silica content respectively. With a high content of zirconium and silica it must be refined at 1400° C. The cooling down and casting of the melts does not exceed the known technical practice.

Having described our invention, what we claim is:

1. Optical glass molten from a mixture consisting essentially of at least one oxide of the group of elements consisting of barium and strontium, at least one oxide of the group of elements consisting of zinc and cadmium, and boric oxide in which the amount of boric oxide is present in amount to form borates of the oxides of the groups and in which the mol ratio of the oxide of the group consisting of barium and strontium to the oxide of the group consisting of zinc and cadmium is between 1.5 and 0.2.

2. The optical glass of claim 1 in which an oxide of the group consisting of magnesium and calcium is added.

3. The optical glass of claim 2 in which the oxide of the group consisting of magnesium and calcium is added as a metaborate in amount up to 20% by weight of the entire mixture.

4. Optical glass of claim 3 molten from a mass which consists essentially of the borates of the group consisting of barium and strontium, of the group consisting of zinc and cadmium and of borates of the group consisting of magnesium and calcium in which the portions of the several borates lie within the following limits:

Percent by weight
Sr and Ba group _____ 5-45
Zn and Cd group _____ 20-30
Mg and Ca group _____ 10-40 and the sum of the borates amounts to between 70% and 85% by weight of the mixture.

5. Optical glass of claim 1 in which up to 15% by weight of $ZrO_2$ is present in the melt.

6. Optical glass of claim 1 in which up to 15% by weight of $SiO_2$ is present in the melt.

7. Optical glass of claim 1 in which up to 20% by weight of PbO is present in the melt.

8. Optical glass of claim 1 in which index of refraction controls are present in the glass, said controls consisting of at least one member of the group consisting of $WO_3$ up to 5% by weight and PbO up to 10% by weight.

9. Optical glass of claim 1 in which the melt is stabilized by the addition of $Al_2O_3$ up to 10% by weight.

References Cited in the file of this patent

UNITED STATES PATENTS 2,764,492   Weissenberge et al. _____ Sept. 25, 1956